(12) United States Patent
Miotto

(10) Patent No.: US 7,992,268 B2
(45) Date of Patent: Aug. 9, 2011

(54) FASTENING CLIP DEVICE

(75) Inventor: Onorio Miotto, Valdobbiadene (IT)

(73) Assignee: Evoluzione S.R.L., Valdobbiadene (IT)

( * ) Notice: Subject to any disclaimer, the term of this patent is extended or adjusted under 35 U.S.C. 154(b) by 444 days.

(21) Appl. No.: 12/227,215

(22) PCT Filed: May 15, 2007

(86) PCT No.: PCT/EP2007/054672
§ 371 (c)(1),
(2), (4) Date: Nov. 12, 2008

(87) PCT Pub. No.: WO2007/135015
PCT Pub. Date: Nov. 29, 2007

(65) Prior Publication Data
US 2009/0172923 A1      Jul. 9, 2009

(30) Foreign Application Priority Data

May 18, 2006   (IT) .............................. VE2006A0029

(51) Int. Cl.
*F16B 45/02*   (2006.01)
(52) U.S. Cl. ..................................... 24/599.8; 24/599.1

(58) Field of Classification Search ................. 24/599.1, 24/599.3–600.3
See application file for complete search history.

(56) References Cited

U.S. PATENT DOCUMENTS 2,418,111 A * 4/1947 Dahlander ................ 294/82.31

FOREIGN PATENT DOCUMENTS

| CH | 507 678 A | 5/1971 |
| DE | 10 2005 013031 A1 | 12/2005 |

* cited by examiner

*Primary Examiner* — James Brittain
(74) *Attorney, Agent, or Firm* — Themis Law

(57) ABSTRACT

A fastening clip device comprising arms of different length pivoted together about a transverse pin on one and the other side thereof, and elastic means which maintain two facing portions of said arms spaced apart, one end of one of said arms being bent substantially to U-shape to retain the end of the other arm against the action of said elastic means, characterized in that the arm of smaller length comprises two apertures positioned on one and the other side of the pin about which the two arms are pivoted, and by comprising a flexible puller which passes through said apertures, extends between the pin and the arm of greater length, and is fixed to the curved portion of said arm.

8 Claims, 3 Drawing Sheets

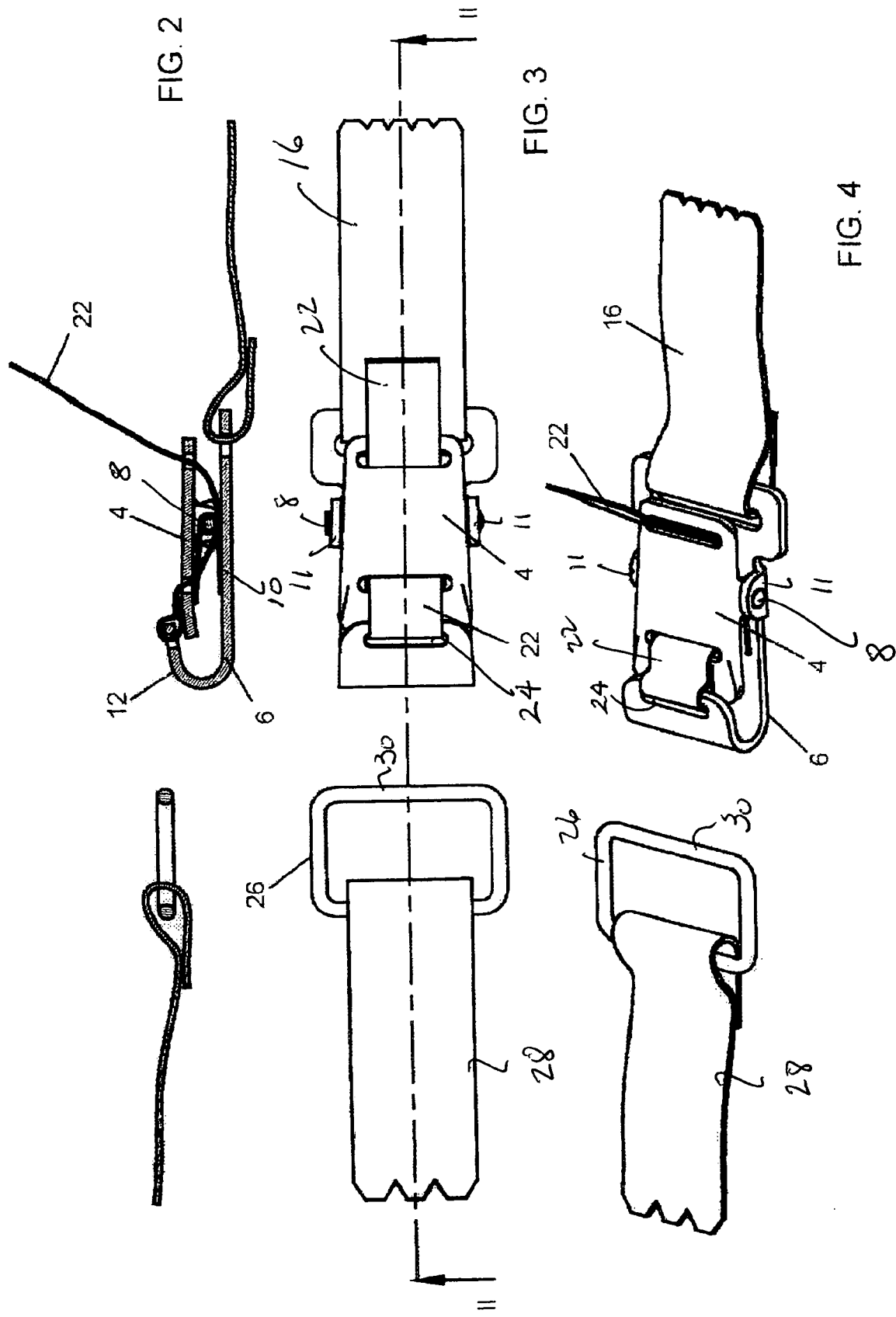

FASTENING CLIP DEVICE

FIELD OF THE INVENTION

The present invention relates to a fastening clip device.

BACKGROUND OF THE INVENTION

Fastening clip devices are known for fastening the sides of sports jackets, shoulder straps for large bags, etc.

These known devices consist substantially of a clip fixed to a flexible strap and formed from two arms pivoted about a central pin and maintained elastically spaced apart by a spring. One of the two arms of the clip has a U-curved end to retain the end of the other arm and to form a seat for housing a ring fixed to another flexible strap.

A drawback of this clip is the considerable effort required to disengage the ring from the clip, as the ring has to be brought close to the curved portion with one hand, then the ends of the two contacting arms have to be pressed with the other hand to create a passage and the ring then passed through the passage bounded by the two spaced-apart arms.

BRIEF SUMMARY OF THE INVENTION

An object of the invention is to eliminate these drawbacks by providing a fastening clip device which enables the ring to be disengaged easily and comfortably by using one hand to operate a puller, or release strap.

This and other objects which will be apparent from the ensuing description are attained according to the invention by a fastening clip device as described hereinafter.

BRIEF DESCRIPTION OF THE DRAWINGS

A preferred embodiment of the present invention is further clarified hereinafter with reference to the accompanying drawings, in which:

FIG. 2 is a longitudinal section therethrough on the line II-II of FIG. 3, FIG. 3 is a plan view thereof, FIG. 4 is a perspective view thereof.

DETAILED DESCRIPTION

Figure 1:
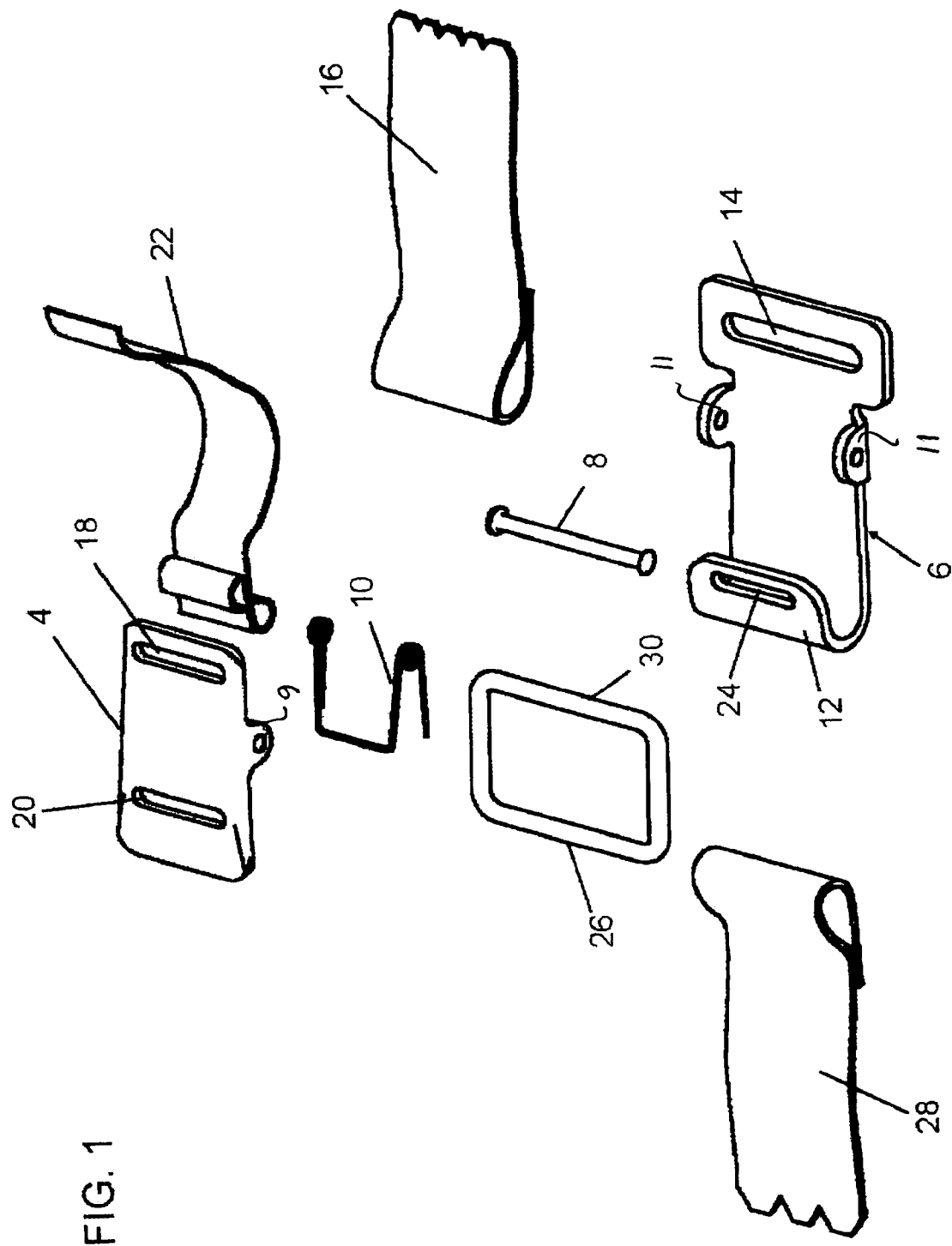
FIG. 1 is an exploded perspective view of the fastening clip device according to the invention.

As can be seen from the figures, the fastening device, according to the invention, comprises a clip 2 consisting of two arms 4, 6 pivoted together about a transverse pin 8 and maintained spaced apart, at one end, by a spring 10. Ears 9 are situated on opposite sides of arm 4 and depend beneath arm 4, at its midpoint.

The arm 6 presents a U-bend 12 at one end, and is provided, at its other end, with a slotted aperture 14 for receiving strap 16. Ears 13, 15 extend upwardly from arm 6, at its midpoint.

The other arm 4 is substantially flat, and is smaller than plate 6. Transverse slots 18, 20 are formed in arm 4, one slot on each side of pin 8. Flexible puller, or release strap 22, passes downwardly through slot 18, below pin 8, and exits upwardly through slot 20. The free end of puller, or release strap 22, is then secured within slot 24 located in bend 12 of arm 6, as shown in FIG. 2. Pin 8 extends transversely across the arms 4 and 6, and is received in cooperating ears 9 and 11, on arms 4 and 6, respectively.

The fastening device of the invention operates in the following manner.

Figure 5:
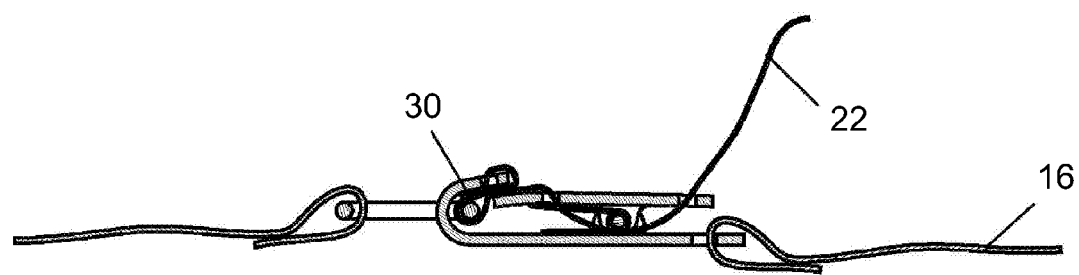
FIGS. 5, 6 and 7 show the device in the same view as FIG. 2 during the disengagement of the ring.

By overcoming the elastic reaction of spring 10, the user inserts the ring 26, fixed to strap 28, between the two arms 4 and 6 of clip 2 (see FIG. 2). During this insertion, the leading side 30 of the ring 26 interferes with the puller 22, which is forced inwardly between the two arms (see FIG. 5).

Figure 6:
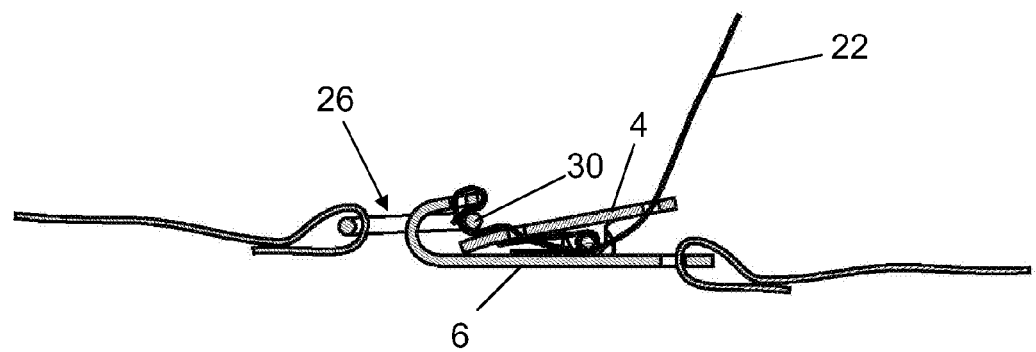

When the ring 26 is to be disengaged from the clip 2, the puller 22, or release strap, is pulled. This operation initially causing the end of the arm 4 to withdraw from the bend 12 of the other arm 6 (see FIG. 6), and then causing the leading side 30 of the ring 16 to separate from the two arms 4 and 6.

Figure 7:
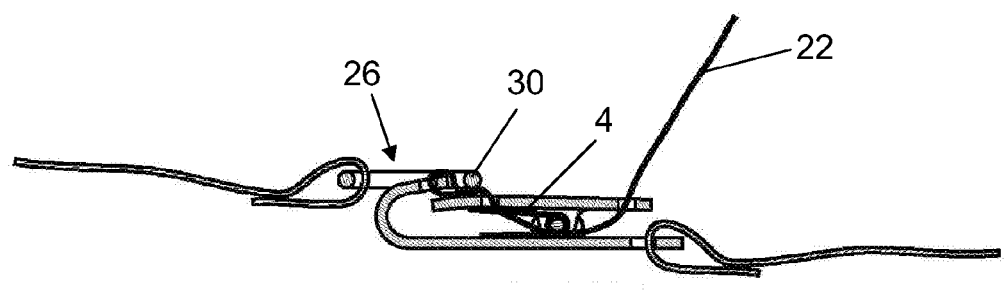

On further pulling of the puller 22, the leading side 30 of the ring 16 completely leaves the clip, and the ends of the arms 4 and 6 again come into mutual contact (see FIG. 7) within bend 12, under the urging of spring 10.

From the aforegoing it is apparent that the fastening device of the invention enables the ring to be disengaged in a simple and comfortable manner using only one hand.

The invention claimed is:

1. A fastening clip device comprising:
 a first and a second arms of different lengths pivoted together about a transverse pin on one and another side thereof;
 elastic means which maintain two facing portions of said first and second arms spaced apart, one end portion of the second arm being curved substantially to U-shape to retain an end of the first arm against an action of said elastic means, wherein the first arm is of smaller length and comprises two apertures positioned on one and the other side of the pin about which the first and the second arms are pivoted; and
 a puller which passes through said apertures, extends between the pin and the arm of greater length, and is fixed to the curved end portion of said second arm.

2. The device as claimed in claim 1, wherein the puller comprises a band engaged in a slot in the curved end portion of the second arm.

3. The device as claimed in claim 1, wherein the puller is fixed to a free end of the curved end portion of the second arm.

4. A fastening clip comprising:
 a first and a second arms of different lengths;
 mounting means formed on opposite sides of said arms;
 a transverse pin extending laterally through said mounting means so that said arms can pivot thereabout;
 a spring situated between said arms to maintain said arms spaced apart, an end portion of said second arm being curved to a substantially U-shape to retain an end of said first arm therewithin under a force exerted by said spring;
 a transverse slot formed through the curved portion in said second arm;
 a first aperture formed on an end portion of said first arm, and a second aperture formed on an opposite end portion thereof, said first and second apertures being located on opposite sides of said transverse pin; and
 a release strap passing through said first and second apertures in said first arm, below said transverse pin, and secured within said transverse slot in said curved end portion of said second arm,
 whereby said release strap, when pulled, forces the first arm to pivot about said transverse pin out of engagement with the curved end portion of said second arm, thereby releasing any ring previously retained between said first and second arms of said clip.

5. The fastening clip as claimed in claim 4, wherein said mounting means for said transverse pin comprises ears formed on one side of said first arm, and cooperating ears formed on an opposing side of said second arm.

6. The fastening clip as claimed in claim 4, wherein said first arm is smaller than said second arm, and the end of said first arm fits within the curved end portion of said second arm.

7. The fastening clip as claimed in claim 4, wherein said spring is seated upon said transverse pin to exert a force against opposing surfaces of said first and second arms.

8. The fastening clip as claimed in claim 4, wherein said release strap passes downwardly through said first aperture in said first arm, about said transverse pin, then passes upwardly through said second aperture in said first arm, and is then secured within the transverse slot in the curved end portion of the second arm of said clip.

* * * * *